United States Patent
Daniels

(10) Patent No.: US 6,793,179 B2
(45) Date of Patent: Sep. 21, 2004

(54) AIRCRAFT ANTITERRORIST SECURITY SYSTEM

(76) Inventor: John James Daniels, 511 Foot Hills Rd., Higganum, CT (US) 06441

( * ) Notice: Subject to any disclaimer, the term of this patent is extended or adjusted under 35 U.S.C. 154(b) by 0 days.

(21) Appl. No.: 10/242,123

(22) Filed: Sep. 12, 2002

(65) Prior Publication Data

US 2004/0051001 A1 Mar. 18, 2004

Related U.S. Application Data

(60) Provisional application No. 60/318,723, filed on Sep. 12, 2001.

(51) Int. Cl.$^7$ ............................................. B64D 11/00
(52) U.S. Cl. .................... 244/118.5; 340/945; 340/541
(58) Field of Search ............................ 244/118.5, 1 R; 340/945, 541

(56) References Cited

U.S. PATENT DOCUMENTS

| | | | | |
|---|---|---|---|---|
| 4,112,818 A | * | 9/1978 | Garehime, Jr. ............. | 89/41.05 |
| 6,474,599 B1 | * | 11/2002 | Stomski .................... | 244/118.5 |
| 6,499,693 B1 | * | 12/2002 | Rogson .................... | 244/118.5 |
| 2002/0158166 A1 | * | 10/2002 | Lin ......................... | 244/118.5 |
| 2003/0052798 A1 | * | 3/2003 | Hanson ..................... | 340/945 |

FOREIGN PATENT DOCUMENTS

| DE | 2749034 | * | 5/1979 |
|---|---|---|---|
| FR | 2662419 | * | 11/1991 |

* cited by examiner

*Primary Examiner*—J. Woodrow Eldred
(74) *Attorney, Agent, or Firm*—John J. Daniels, Esq.

(57) ABSTRACT

An aircraft antiterrorist security system is provided. An intrusion resistant door system separates a pilot cockpit area from a passenger area on an aircraft. A remotely activatable personnel incapacitating system is provided that is effective for incapacitating personnel located within the passenger area. A remote control system is provided that is effective for remotely activating the personnel incapacitating system. The remote control system may comprise a manually activatable actuator located in the pilot cockpit area. In addition, or alternatively, the remote control system may comprise a wirelessly activatable mechanism for receiving control signals from a ground-based location for remotely activating the personnel incapacitating system. Alternatively or additionally, the remote control system may comprise a passenger-activatable mechanism for enabling passengers to activate the personnel incapacitating system. The passenger-activatable mechanism may require one or more simultaneous individual passenger activation.

19 Claims, 1 Drawing Sheet

AIRCRAFT ANTITERRORIST SECURITY SYSTEM

CROSS REFERENCE TO RELATED APPLICATIONS

This is a Utility Application of U.S. Provisional Application Serial No. 60/318,723, filed Sep. 12, 2001.

BACKGROUND OF THE INVENTION

The present invention pertains to an aircraft antiterrorist security system. More particularly, the present invention pertains to a system for preventing terrorist personnel located in a passenger area of an aircraft from taking control of the aircraft, and limiting the harm done to passengers aboard the aircraft by such terrorist personnel.

SUMMARY OF THE INVENTION

The present invention is intended to overcome the drawbacks of the prior art. It is an object of the present invention to provide a system for preventing terrorist personnel located in a passenger area of an aircraft from taking control of the aircraft. It is another object of the present invention to limit the harm done to passengers or crew members aboard the aircraft by such terrorist personnel.

In accordance with the present invention, an aircraft antiterrorist security system is provided. An intrusion resistant door system separates a pilot cockpit area from a passenger area on an aircraft. A remotely activatable personnel incapacitating system is provided that is effective for incapacitating personnel located within the passenger area. A remote control system is provided that is effective for remotely activating the personnel incapacitating system.

The remote control system may comprise a manually activatable actuator located in the pilot cockpit area. In addition, or alternatively, the remote control system may comprise a wirelessly activatable mechanism for receiving control signals from a ground-based location for remotely activating the personnel incapacitating system. Alternatively or additionally, the remote control system may comprise a passenger-activatable mechanism for enabling passengers to activate the personnel incapacitating system. The passenger-activatable mechanism may require one or more simultaneous individual passenger activation.

In accordance with the present invention, the personnel incapacitating system includes at least one of a system for filling the passenger area with an incapacitating gas such as tear gas, nitrous oxide, or the like, a system for spraying the passenger area with a movement inhibiting material such as a sticky material, expanding foam or the like, a system for introducing sound frequencies into the passenger area effective to reduce the capacity for harm by personnel.

The intrusion resistant door may include a remotely activatable lock controllable via control signals generated by remotely located control devices under the control of at least one of a pilot of the aircraft, a crew member of the aircraft, two or more simultaneously acting passengers, and a wirelessly transmitted signal generated by a ground-based system. The intrusion resistant door may include a substantially air resistant seal to prevent a personnel incapacitating gas from entering the pilot cockpit area. Further, the intrusion resistant door may be constructed so as to be substantially bullet resistant.

DETAILED DESCRIPTION OF THE INVENTION

Figure 1:
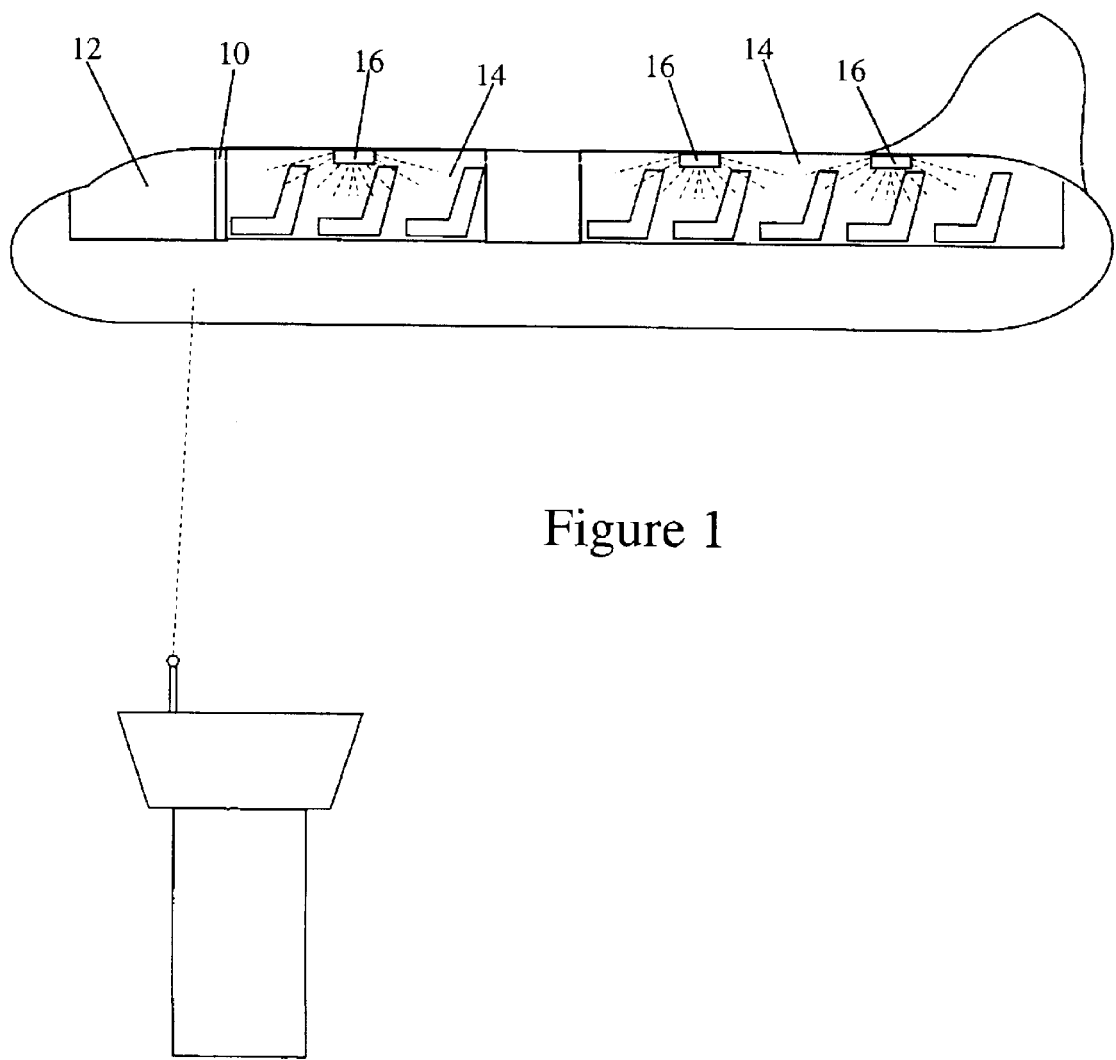
FIG. 1 schematically shows the inventive antiterrorist aircraft control system.

As shown in FIG. 1, the present invention provides a system for preventing terrorist personnel located in a passenger area 14 of an aircraft from taking control of the aircraft. The present invention is also intended to limit the harm done to passengers or crew members aboard the aircraft by such terrorist personnel.

In accordance with the present invention, an aircraft antiterrorist security system is provided. An intrusion resistant door system 10 separates a pilot cockpit area 12 from a passenger area 14 on an aircraft. A remotely activatable personnel incapacitating system 16 is provided that is effective for incapacitating personnel located within the passenger area 14. A remote control system 18 is provided that is effective for remotely activating the personnel incapacitating system 16.

The remote control system 18 may comprise a manually activatable actuator located in the pilot cockpit area 12. In this case, the pilot can activate the personnel incapacitating system 16 from within the safety of the cockpit area 12. In addition, or alternatively, the remote control system 18 may comprise a wirelessly activatable mechanism for receiving control signals from a ground-based location for remotely activating the personnel incapacitating system 16. Thus, a ground control tower can activate the personnel incapacitating system 16 remotely from the ground. Safe guards, such as password protected pilot override or the requirement of two ground control personnel to simultaneously activate the remote control system 18 may be in place to limit unwarranted activations. Alternatively or additionally, the remote control system 18 may comprise a passenger-activatable mechanism for enabling passengers to activate the personnel incapacitating system 16. In this case, the passenger-activatable mechanism may require one or more simultaneous individual passenger activation. For example, to confuse potential terrorists three or more passengers may be randomly chosen to secretly hold the remote activation device, or the remote activation device may be present at one or more seats. A short window of activation may be provided through a simple RC-type timing circuit, or the like, so that two or more passengers must clearly intend to activate the personnel incapacitating system. Further, a marker, such as a dye or other means, may be provided to identify the passengers who activate the system to discourage false activatations.

In accordance with the present invention, the personnel incapacitating system 16 may include a system for filling the passenger area 14 with an incapacitating gas such as tear gas, nitrous oxide, or the like. In addition, or alternatively, a system for spraying the passenger area 14 with a movement inhibiting material such as a sticky material, expanding foam or the like, may be provided to prevent terrorists from thwarting the system by using gas masks. A system for introducing sound frequencies into the passenger area 14 effective to reduce the capacity for harm by personnel may also be employed. For example, ultra high or ultra low frequency sound may be used to incapacitate or disorient the terrorists.

The intrusion resistant door 10 may include a remotely activatable lock controllable via control signals generated by remotely located control devices under the control of at least one of a pilot of the aircraft, a crew member of the aircraft, two or more simultaneously acting passengers, and a wirelessly transmitted signal generated by a ground-based system. The intrusion resistant door 10 may include a substantially air resistant seal to prevent a personnel incapacitating gas from entering the pilot cockpit area 12. Further, the intrusion resistant door 10 may be constructed so as to be substantially bullet resistant.

What is claimed is:

1. An aircraft antiterrorist security system, comprising:

A remotely activatable personnel incapacitating system effective for incapacitating personnel located within the passenger area;

A remote control system effective for remotely activating the personnel incapacitating system, the remote control system comprising a wirelessly activatable mechanism for receiving control signals activated by ground-based personnel for remotely activating the personnel incapacitating system.

2. An aircraft antiterrorist security system according to claim 1; wherein the remote control system further comprises an manually activatable actuator located in the pilot cockpit area and means for activating the personnel incapacitating system only when activation of the manually activatable actuator is followed by the reception of control signals activated by ground-based peronnel.

3. An aircraft antiterrorist security system according to claim 1; wherein the remote control system further comprises a passenger-activatable mechanism for enabling passengers to activate the personnel incapacitating system and means for activating the personnel incapacitating system only when activation of the passenger-activable mechanism is followed by the reception of control signals from the ground-based location for remotely activating the personnel incapacitating system.

4. An aircraft antiterrorist security system according to claim 1; wherein the wirelessly activatable mechanism requires two or more simultaneous individual activations by the ground-based personnel.

5. An aircraft antiterrorist security system according to claim 1; wherein the personnel incapacitating system includes at least one of a system for filling the passenger area with an incapacitating gas such as tear gas, nitrous oxide, a system for spraying the passenger area with a movement inhibiting material, a system for introducing sound frequencies into the passenger area effective to reduce the capacity for harm by personnel.

6. An aircraft antiterrorist security system according to claim 1; further comprising an intrusion resistant door separating a pilot cockpit area from the passenger area, the intrusion resistant door includes a remotely activatable lock controllable via control signals generated by remote control devices under the control of at least one of a pilot of the aircraft, a crew member of the aircraft, two or more simultaneously acting passengers, and a wirelessly transmitted signal generated by a ground-based system.

7. An aircraft antiterrorist security system, comprising:

A remotely activatable personnel incapacitating system effective for incapacitating personnel located within the passenger area, the personnel incapacitating system comprising a movement inhibiting material; and A remote control system effective for remotely activating the personnel incapacitating system.

8. An aircraft antiterrorist security system according to claim 7; wherein the remote control system comprises an manually activatable actuator located in the pilot cockpit area.

9. An aircraft antiterrorist security system according to claim 7; wherein the remote control system comprises a wirelessly activatable mechanism for receiving control signals from a ground-based location for remotely activating the personnel incapacitating system.

10. An aircraft antiterrorist security system according to claim 7; wherein the remote control system comprises a passenger-activatable mechanism for enabling passengers to activate the personnel incapacitating system.

11. An aircraft antiterrorist security system according to claim 10; wherein the passenger-activatable mechanism requires one or more simultaneous individual passenger activation.

12. An aircraft antiterrorist security system according to claim 7; wherein the personnel incapacitating system further includes at least one of a system for filling the passenger area with an incapacitating gas such as tear gas, nitrous oxide, or the like, a system for introducing sound frequencies into the passenger area effective to reduce the capacity for harm by personnel.

13. An aircraft antiterrorist security system according to claim 7; further comprising an intrusion resistant door including a remotely activatable lock controllable via control signals generated by remote control devices under the control of at least one of a pilot of the aircraft, a crew member of the aircraft, two or more simultaneously acting passengers, and a wirelessly transmitted signal generated by a ground-based system.

14. An aircraft antiterrorist security system, comprising:

A remotely activatable personnel incapacitating system effective for incapacitating personnel located within the passenger area;

A remote control system effective for remotely activating the personnel incapacitating system; the remote control system comprises a passenger-activatable mechanism for enabling passengers to activate the personnel incapacitating system; the passenger-activable mechanism requiring two or more substantially simultaneous individual passenger activations.

15. An aircraft antiterrorist security system according to claim 14; wherein the remote control system includes means for activating the personnel incapacitating system only when two or more substantially simultaneous individual passenger occur within a predetermined time window of activation.

16. An aircraft antiterrorist security system according to claim 14; further comprising means for identifying the passengers who activate the two more substantially simultaneous individual passenger activations.

17. An aircraft antiterrorist security system according to claim 14; wherein the personnel incapacitating system includes at least one of a system for filling the passenger area with an incapacitating gas such as tear gas, nitrous oxide, or the like, a system for spraying the passenger area with a movement inhibiting material such as a sticky material, expanding foam or the like, a system for introducing sound frequencies into the passenger area effective to reduce the capacity for harm by personnel.

18. An aircraft antiterrorist security system according to claim 14; wherein the remote control system further comprises an manually activatable actuator located in the pilot cockpit area and means for activating the personnel incapacitating system only when activation of the manually activatable actuator occurs following the one or more individual passenger activations.

19. An aircraft antiterrorist security system according to claim 1; wherein the remote control system further comprises a wirelessly activatable mechanism for receiving control signals from a ground-based location for remotely activating the personnel incapacitating system.

* * * * *